Patented Oct. 3, 1950

2,524,424

UNITED STATES PATENT OFFICE

2,524,424

TREATMENT OF RUBBERLIKE POLYMERS FROM BUTADIENE HYDROCARBONS WITH CARBOXYLIC ACID ANHYDRIDES

Raymond Buret, Melle, France, assignor to Les Usines de Melle (Societe Anonyme), Saint-Leger-les-Melle, France, a company of France No Drawing. Application May 1, 1945, Serial No. 591,399. In France November 12, 1941

Section 1, Public Law 690, August 8, 1946
Patent expires November 12, 1961

5 Claims. (Cl. 260—79.5)

It is known that synthetic rubbers produced by polymerizing pure diolefines do not possess general properties sufficient for competing with natural rubber. It is the discovery of copolymerization of diolefines with substances such as acrylic acid nitrile and styrene, which has enabled of producing actually marketable gums, capable of making a stand against plantation rubber and sometimes even outclassing it at least in respect of special properties such as behaviour towards solvents, oils and gasolines.

However, synthetic rubbers generally cause far larger difficulties in mixing than natural gum and the output capacity of a factory as regards manufactured rubber articles is largely lowered when synthetic gums are dealt with instead of natural rubber.

It is a primary object of this invention to provide a method which is very simple in use and enables of improving general qualities of synthetic gums, more particularly in respect of plasticity, strength and elongation capability. Thus, besides the object of facilitating operation, this invention has for an object to impart sufficient qualities to synthetic gums of second-rate value such as commonly obtained, for instance from pure butadiene, so that they become commercially valuable.

This invention comprises incorporating in the gum a small percentage of an acid anhydride as hereinafter defined (previously powdered in the case of a solid anhydride), thereby immediately starting a reaction of said anhydride with the gum; the reaction shows itself in a considerable change of plasticity of the mix, and sometimes in a colour change. Generally, it is advisable to heat the mixture for completing reaction.

After allowing the altered gum to cool if desired, said gum is vulcanized according to the practice which is customary in like instances but care should be exercized to adjust the amounts of additional ingredients, i. e. sulphur, accelerators and fillers, as well as the operating conditions, i. e. temperature and heating time, in accordance with the character of the new material; as a matter of fact, when studying vulcanisation conditions, it has been ascertained that the gum on treatment actually behaves as a novel substance for which details of vulcanizing operation need be stated separately.

Messrs. Compagnon and Le Bras (Comptes-rendus à l'Académie des Sciences, 1941, No. 14, page 616) already pointed out that natural rubber can be improved in respect of its behaviour towards solvents by incorporating therein small amounts of maleic anhydride but the latter acted solely through the double bond in its vinyl radicle, the anhydride function playing merely the part of an activator.

On the contrary, in this invention, a like reaction is strictly precluded as use is made of saturated organic acid anhydrides and organic acid anhydrides having only double bonds of non-olefinic character, as will hereinafter be apparent. One is thus led to consider that it is the very acid anhydride function which directly operates in the reaction with rubber, although up to this time it has not been possible to determine with certitude the precise nature of said reaction.

Leaving aside the foregoing theories, it is found that after proper vulcanization, there is obtained a rubber the qualities of which outshine to a surprising degree those of the original gums, and the importance of such an improvement can be ascribed but to an alteration of the gum structure. Thus, in certain cases, tensile strength was doubled while elongation capability and resistance to solvents were increased.

As already set forth, vulcanization may be performed directly after proper incorporation of anhydride into gum, without any previous heating. However in some cases the general qualities of the final rubber are slightly detracted by reason of absence of previous heating.

The anhydrides that may be employed successfully in accordance with the present invention are anhydrides of organic carboxylic acids that are free from olefinic and acetylenic carbon-carbon linkages and which, except for the anhydride group, consist solely of carbon and hydrogen atoms. These include anhydrides of saturated acyclic acids, such as acetic anhydride and butyric anhydride; anhydrides of saturated cyclic acids, such as camphoric acid; anhydrides of acids having an aromatic nucleus, such as benzoic anhydride; and "inner" anhydrides of both acyclic and cyclic acids, such as succinic anhydride and phthalic anhydride.

The anhydrides may be used alone or in admixture.

The amount of anhydride to be incorporated may vary from 0.5 to 15 per cent, as reckoned upon the weight of the gum. When the proportion is large, the gums obtained are much plastic and generally become less valuable.

As a consequence, the elongation index increases as the anhydride content is raised but beyond a certain limit, the strength eventually decreases and falls below acceptable values.

In actual practice, it is advantageous to select anhydride amounts varying from 2 to 10 per cent according to the result aimed at, the nature of the gum to be treated and that of the anhydride on use, but it should be understood that the foregoing indication is not limitative as regards the ambit of this invention.

I have ascertained that it is advantageous to admix anhydride with gum before introducing vulcanization ingredients. Should the reverse sequence be adopted, the improvements are far less important.

The following examples which have no limitative character will show how this invention may be carried into practice, the parts being by weight.

Example 1.—The starting material was a synthetic gum prepared from pure butadiene. 4 parts of finely powdered phthalic anhydride were added to 100 parts of the gum; the mass was mixed and subjected to previous heating for 3 hours at 120° C. It was then vulcanized by adding 4 parts of sulphur, 0.4 part of an accelerator and 10 parts of zinc oxide, mixing as usual and heating to 140–145° C. for 20 minutes.

The strength as compared with that of the same gum properly vulcanized but without previous addition of anhydride, exhibited an increase of 40 per cent; correlatively the elongation increased by an amount of 60 per cent; the capability of mixing on rolls was excellent.

Example 2.—The starting material was a synthetic gum manufactured by copolymerizing butadiene with 15 per cent of ethyl ester of cyanacetic acid (as disclosed in the copending patent application Serial No. 613,420, filed August 29, 1945 by Henri M. Guinot jointly with me, now Patent Number 2,479,490). 8 per cent of phthalic anhydride was incorporated therein. The mix was vulcanized by heating to 140–145° C. for 20 minutes with 4 parts of sulphur, 2 parts of an accelerator and 10 parts of zinc oxide.

The gum thus produced exhibited a strength increase of 20 per cent and an elongation increase of 100 per cent as compared with a synthetic gum sample taken from the same stock but not previously treated with phthalic anhydride.

With benzoic anhydride, the strength increase was 40 per cent and the elongation increase 40 per cent. With camphoric anhydride, they were respectively 30 per cent and 30 per cent. With acetic anhydride, the increases were respectively 20 per cent and 30 per cent.

Example 3.—The starting material was a synthetic gum manufactured by copolymerizing butadiene with 20 per cent of acrylic acid nitrile. 4 parts of each one of the following anhydrides: acetic and phthalic anhydrides were incorporated into samples of the aforesaid gum, the mixing of which can be performed but with difficulty. The samples were preheated to 120° C. for an hour, after which they could easily be mixed.

Vulcanization was performed with 4 parts of sulphur, one or two parts of accelerator according to the samples and 10 parts of zinc oxide, by heating for 20 minutes to 140–145° C.

With reference to like samples not treated with anhydrides, the strength and elongation increases were respectively 30 and 40 per cent for acetic anhydride, 40 and 70 per cent for phthalic anhydride.

Example 4.—The starting material was a synthetic gum manufactured from butadiene and 20 per cent of styrene, 4 parts of phthalic anhydride were incorporated in a sample of the gum. The sample was previously heated for two hours at 120° C. Vulcanization was then performed for 20 minutes at 135–140°, in accordance with Example 3.

The strength and elongation increases over an untreated control sample were respectively 40% and 40%.

This invention is applicable to gums obtained from diolefines other than butadiene, for instance, piperylene, dimethylbutadiene and the like. It is also possible to start from synthetic gums such as neoprenes; however it has been found that the improvement is less decided than in the case of polymerized diolefines.

It is still within the ambit of this invention to work with mixtures of synthetic gums or even mixtures containing natural rubber, as the aforesaid acid anhydrides also react with natural rubber to alter its properties.

What I claim is:

1. A process for the production of an improved resilient rubbery vulcanized synthetic composition of matter having substantially improved strength and elongation characteristics, which comprises mechanically working a mix consisting of (a) a rubber-like synthetic product selected from the class consisting of synthetic products of polymerization of butadiene hydrocarbons and synthetic products of co-polymerization of butadiene hydrocarbons with substances capable of co-polymerizing therewith, and (b) from 0.5 to 15% by weight, calculated with respect to the weight of said rubber-like synthetic product (a), of an anhydride of an organic carboxylic acid free from olefinic and acetylenic carbon-carbon linkages and which, except for the anhydride group, consists solely of carbon and hydrogen atoms; then heating said mix to a temperature of about 120° C. for about 1 to about 3 hours; then incorporating vulcanizing ingredients that comprise sulphur in said mix; and subjecting said mix to vulcanizing conditions.

2. The process of claim 1, said anhydride being the anhydride of an aromatic acid.

3. The process of claim 1, said anhydride being the anhydride of an aromatic dicarboxylic acid.

4. The process of claim 1, said anhydride being phthalic anhydride.

5. The process of claim 1, said anhydride being the anhydride of an organic acyclic carboxylic acid.

RAYMOND BURET.

REFERENCES CITED

The following references are of record in the file of this patent:

UNITED STATES PATENTS

| Number | Name | Date |
| --- | --- | --- |
| 1,871,037 | Cadwell | Aug. 4, 1932 |
| 1,981,168 | Gerke | Nov. 20, 1934 |
| 2,213,954 | Crawford | Sept. 10, 1940 |
| 2,265,722 | De Nie | Dec. 9, 1941 |
| 2,366,317 | Davis | Jan. 2, 1945 |
| 2,386,968 | Martin | Oct. 16, 1945 |
| 2,387,481 | Vincent | Oct. 23, 1945 |
| 2,387,502 | Downey | Oct. 23, 1945 |
| 2,388,905 | Compagnon | Nov. 13, 1945 |

FOREIGN PATENTS

| Number | Country | Date |
| --- | --- | --- |
| 542,645 | Great Britain | Jan. 21, 1945 |
| 549,759 | Germany | Apr. 30, 1932 |

OTHER REFERENCES

Compagnon et al., Comptes Rendus, vol. 212, April 7, 1941, pp. 616 to 619.

Barron, Modern Synthetic Rubbers Van Nostrand, 1944, pages 46 and 47.